(12) United States Patent
Lambert

(10) Patent No.: US 6,802,229 B1
(45) Date of Patent: Oct. 12, 2004

(54) GEAR DRIVE HAVING CONTINUOUSLY VARIABLE DRIVE RATIO

(76) Inventor: Michael Lambert, P.O. Box 72, North Falmouth, MA (US) 02556

( * ) Notice: Subject to any disclaimer, the term of this patent is extended or adjusted under 35 U.S.C. 154(b) by 0 days.

(21) Appl. No.: 10/452,625

(22) Filed: Jun. 2, 2003

(51) Int. Cl.$^7$ ................................................. F16H 3/22
(52) U.S. Cl. ........................................................ 74/348
(58) Field of Search ......................... 74/347–348, 409, 74/411, 451, 393, 400, 412 R, 416–417, 420, 424.5

(56) References Cited

U.S. PATENT DOCUMENTS

| | | | | |
|---|---|---|---|---|
| 1,528,574 A | * | 3/1925 | Schaum ........................ | 74/348 |
| 2,697,365 A | * | 12/1954 | Williams ...................... | 475/218 |
| 2,711,105 A | * | 6/1955 | Charles ........................ | 475/218 |
| 3,422,702 A | * | 1/1969 | Novinger ..................... | 475/302 |
| 3,608,390 A | | 9/1971 | Barrettt | |
| 5,653,143 A | | 8/1997 | Langevin | |
| 5,934,144 A | * | 8/1999 | Marinkovic ................... | 74/440 |
| 6,321,613 B1 | | 11/2001 | Avidor | |
| 6,415,674 B1 | * | 7/2002 | Davis et al. ................... | 74/409 |

* cited by examiner

*Primary Examiner*—Roger Pang
(74) *Attorney, Agent, or Firm*—Cesari and McKenna, LLP.

(57) ABSTRACT

A continuously variable drive ratio transmission includes a support, a first shaft rotatably mounted to the support so that shaft can rotate about a first axis, a helical rack supported by the first shaft so that the rack has a plurality of toothed convolutions facing away from and spaced apart along the first shaft, the diameters of said convolutions being such that together they define a conical envelope encircling the first shaft. A second shaft is rotatably mounted to the support so that the second shaft is spaced from and extends parallel to the envelope, and a gear member is mounted to the second shaft for rotation therewith, the gear member having teeth which mesh with those of the rack. The gear member is slidable along the second shaft so that the gear member may be positioned at any location along the rack.

15 Claims, 2 Drawing Sheets

GEAR DRIVE HAVING CONTINUOUSLY VARIABLE DRIVE RATIO

This invention relates to a gear drive or transmission. It relates especially to such a gear drive or transmission with a continuously variable input/output drive ratio.

BACKGROUND OF THE INVENTION

1. Field of the Invention

A gear drive or transmission is often interposed between the motor and a driven device such as a rotor, shaft, wheel, etc. so that the device will rotate at a lower speed with higher torque than the motor shaft, or vice versa. A variable speed gear drive has a plurality of gears or gear sets which can be selectively interposed between the input and output shafts of the gear drive so as to change the gear or drive ratio of the drive.

2. Description of the Prior Art

There do exist in the prior art transmissions which have a continuously variable input/output drive ratio. Usually these have a first rotary member which is conical and a cylindrical rotary member, the two members being coupled together by an endless belt loop encircling the members. The torque applied to one member is coupled via the belt to the other member. The speed ratio may be changed by shifting the belt along the length of the conical member. In other words, if the conical member is rotated at a selected speed and the belt is located at the larger diameter end of the conical member, the other member will rotate at a relatively high speed. On the other hand, if the belt is located at the small diameter end of the conical member, the other member will rotate at a lower speed, the speed ratio being dependent upon the cone angle of the conical member.

Such transmissions employing belts are disadvantaged, however, in that there is slippage between the belt loop and the driving and driven members. Also the belt loop may stretch when under load. Consequently there is not a positive transmission of power between the driving and driven members.

In order to avoid the aforesaid problems, attempts have been made to construct transmissions or gear drives whose driving and driven members comprise gears whose teeth mesh to transmit power from the driving to the driven member. As shown in U.S. Pat. Nos. 5,608,390; 5,653,143 and 6,321,613, for example, the transmission may include a rotary conical gear member composed of a series of separate conical sections supported by rotary shaft and a second member in the form of a pinion slidably mounted to a second rotary shaft positioned alongside the conical gear member. The spur gear is rotatably coupled to the second shaft but slidable therealong so that the pinion can be positioned opposite any one of the conical sections making up the conical member so as to vary the input/output drive ratio of the transmission.

Such nominally continuously variable speed gear drives have a problem in that when the pinion is moved along its shaft to change the gear ratio of the transmission, it is momentarily disposed opposite two sections of the conical member at the same time. Since those sections have different diameters, they also have different numbers of teeth. Therefore, rather elaborate steps have to be taken to enable the pinion to mesh properly with the conical gear member at all positions of the pinion. Usually this involves providing a certain amount of rotary play between the various conical sections making up the conical gear member and coupling those sections to their common shaft by means of clutches.

In other such drives, the conical gear sections making up the conical gear member are stepped along their diameters and provided with specially shaped teeth. Those attempted solutions devised to enable changing the drive ratio of such transmissions result in machines which are overly complex and costly. Furthermore, such transmissions do not really have a continuously variable drive ratio because the pinion cannot be left opposite two conical sections of the conical gear member at once for too long a time without causing excessive wear of the gear teeth and greatly increasing the likelihood that the transmission will freeze up or jam.

SUMMARY OF THE INVENTION

Accordingly, it is an object of the present invention to provide an improved variable ratio gear drive or transmission for transferring torque between an input shaft and an output shaft.

Another object of the invention is to provide a transmission of this type whose drive ratio is truly continuously variable over the entire operating range of the transmission.

Another object of the invention is to provide such a gear drive which is less complex than prior comparable variable ratio positive drive transmissions of this general type.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, my transmission comprises a first rotary shaft which carries a continuous coaxial helical toothed rack whose diameter progressively increases along the shaft. Positioned parallel to the toothed surface of the rack as a second rotary shaft which carries a pinion whose teeth mesh with those of the rack. The pinion is rotatably coupled to its shaft but slidable therealong so that its teeth can mesh with those of the rack at any location along the length of the rack.

The drive ratio of the transmission may be changed by sliding the pinion along its shaft by hand or by other suitable means such as a linear actuator, lead screw drive, piston, etc. Either one of the two shafts may function as the driving or input member, the other shaft then being the driven or output member. In either event, since the slidable pinion may remain in driving engagement with the rack at any point along the length of the rack, the transmission does have a drive ratio which is truly continuously variable over the entire operating range of the transmission.

Since the helical rack is a single continuous member, it may be connected directly to its shaft without the imposition of clutches and other such devices that are found in prior gear drives whose conical gear members are composed of a series of separate conical gear sections.

BRIEF DESCRIPTION OF THE DRAWINGS

For a fuller understanding of the nature and objects of the invention, reference should be made to the following detailed description taken in connection with the accompanying drawings, in which.

DESCRIPTION OF THE PREFERRED EMBODIMENT

Figure 1:
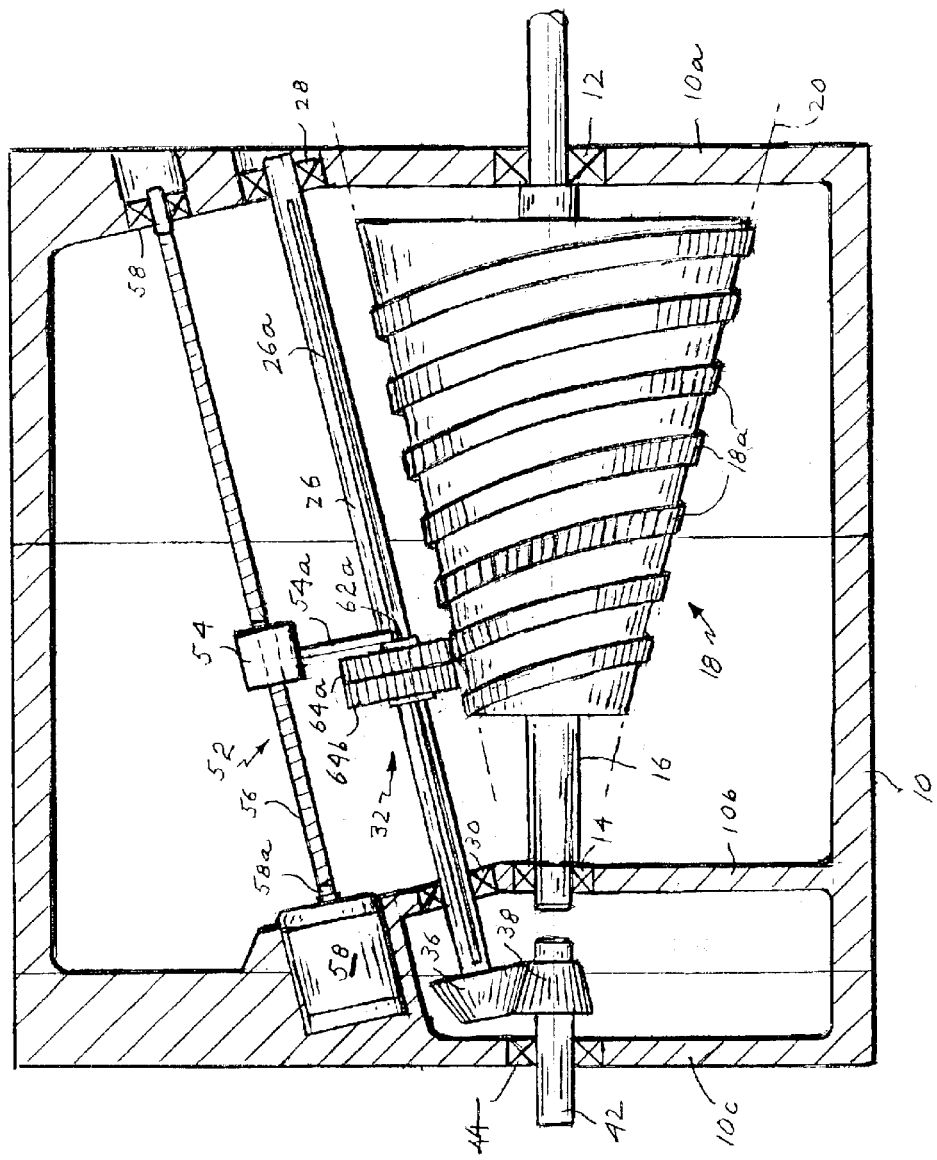
FIG. 1 is a sectional view with parts in elevation of a variable ratio transmission incorporating the invention.

Referring to FIG. 1 of the drawings, my transmission comprises a housing or support 10 having opposite walls 10a and 10b containing bearing units 12 and 14, respectively, for rotatably supporting the opposite ends of a shaft 16. Shaft 16 is mounted to a continuous rack 18 which is wound about the shaft so that it has many spaced apart convolutions 18a. The rack 18 has a conical profile in that the diameters of its convolutions 18a progressively increase along the length of shaft 16 as though the rack 18 were spirally wound about a conical envelope 20 as shown in phantom in FIG. 2. Conical envelope 20 may be real, i.e. a conical segment of shaft 16 as shown in FIG. 1, or it may be in imaginary in which case the convolutions 18a may be connected to shaft 16 by a multiplicity of different-length spokes 22 extending out from shaft 16 to the convolutions 18a at spaced-apart locations along the rack. In both cases, the teeth of the rack convolutions 18a face away from shaft 16 and are more or less parallel to the axis of the shaft. On the other hand, they could face toward the shaft axis.

The transmission depicted in FIG. 1 also includes a second shaft 26 which is spaced parallel to the conical surface of envelope 20. The opposite ends of shaft 26 are rotatably supported by bearing units 28 and 30 in the housing walls 10a and 10b, respectively. Shaft 26 has one or more splines 26a and supports a gear member shown generally at 32 which is rotatably coupled to, but slidable along, shaft 26 so that the teeth of gear member 32 can mesh with those of rack convolutions 18a at any location along the rack.

Either one of the shafts 16 and 26 may be the input or output of the transmission, i.e. either the driving or driven shaft. Although not necessary, to enable the input and output shafts of the transmission to be co-linear, one end of shaft 26 may be provided with a cone gear 36 which meshes with a second cone gear 38 at the end of a third shaft 42 rotatably mounted by means of a bearing unit 44 in a housing or support wall 10c so that the shaft 42 rotates about the same axis as shaft 16. Thus the transmission is completely reversible and either the shaft 16 or the shaft 42 may be the driving member of the transmission, the other shaft then being the driven member.

Still referring to FIG. 1, gear member 32 may be slid along its shaft 26 by means of a slider shown generally at 52. In the illustrated embodiment of the transmission, slider 52 comprises a carriage 54 connected to the gear member 32 by an arm 54a and which travels along a lead screw 56. Screw 56 has one end rotatably supported by a bearing unit 58 in housing or support wall 10a and its opposite end connected to the shaft 58a of a reversible step motor 58 mounted to housing or support wall 10c. When the shaft 58a is rotated in one direction or the other, the gear member 32 is moved in one direction or the other along the shaft 26 and thus meshes with different convolutions of the rack 18, to vary the drive ratio of the transmission. Since the rack 18 is a single continuous member, the gear member 32 can be positioned at any location along the rack so that the drive ratio of the transmission is truly continuously variable as the member 32 is moved between the larger diameter end of rack 18 and the smaller diameter end thereof. Of course, any other conventional actuator maybe used to move the gear member along its shaft.

Figure 2:
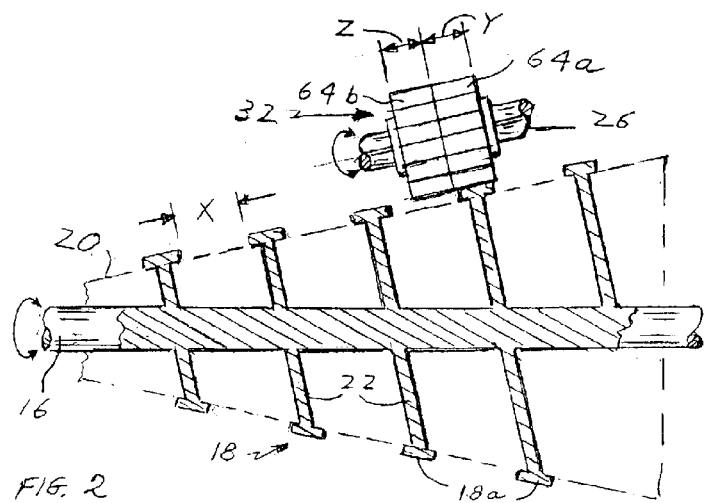
FIG. 2 is a diagrammatic view illustrating the operation of the FIG. 1 transmission.
Figure 3:
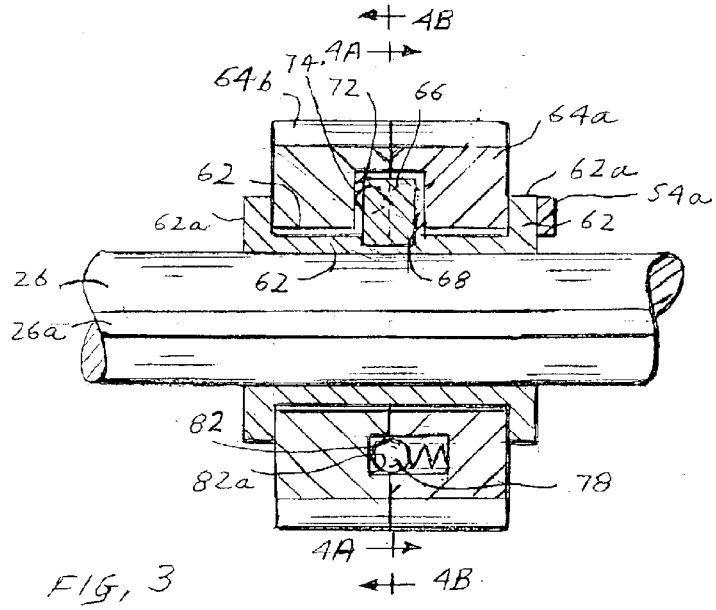
FIG. 3 is an elevational view with parts in section, on a larger scale, showing a portion of the FIG. 1 transmission.

Refer now to FIG. 3 which shows the gear member 32 in greater detail. It comprises a sleeve 62 whose inner surface is slotted to receive the spline(s) 26a of shaft 26. Thus the sleeve 62 is rotatably fixed to, but slidable along, shaft 26. Relatively loosely encircling sleeve 62 is at least one pinion, 64a. The at least one pinion 64a is captured on the sleeve by sleeve end flanges 62a and 62b. As best seen in FIG. 2, the teeth of pinion 64a mesh with those of the helical rack 18. Depending upon the spacing X of the convolutions 18a, the gear member 32 may have a single, pinion 64a rotatably fixed to sleeve 62 and thus to shaft 26 or member 32 may include an additional pinion 64b on sleeve 62 next to pinion 64a.

More particularly, if the spacing X is small and rack 18 has a relatively small cone angle, the teeth of adjacent convolutions 18a are offset only slightly relative to one another. Therefore, a single pinion 64a may be used whose width Y is at least somewhat greater than X and whose teeth are formed so as to have a somewhat loose fit with those of rack 18.

On the other hand, for larger convolution spacings X and larger rack cone angles, gear member 32 may include a second pinion 64b as shown wherein the combined widths Y and Z, respectively, of the two pinions should be greater then X, with both pinions having teeth which mesh normally with those of the rack.

Figure 4A:
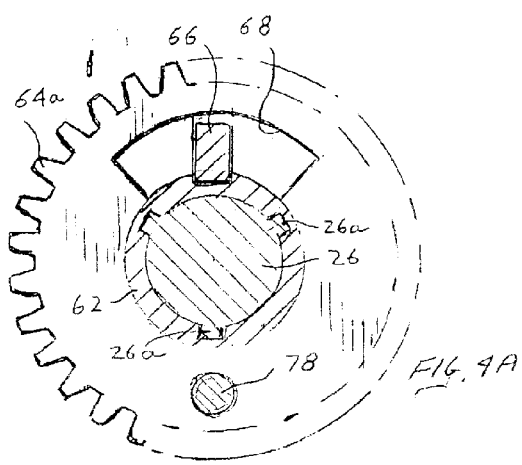
FIGS. 4A and 4B are sectional views taken along lines 4A—4A and 4B—4B, respectively, of FIG. 3.
Figure 4B:
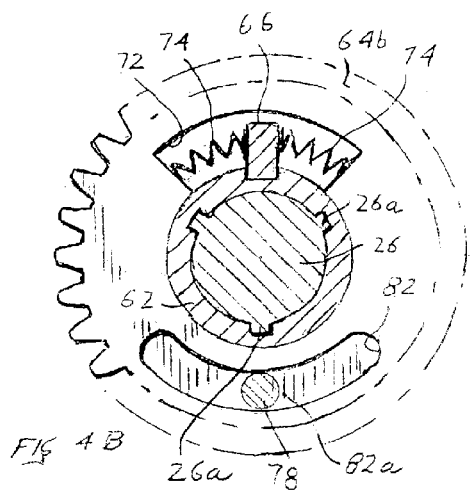

If the gear member 32 does have two pinions 64a,64b, the pinions are preferably formed so as to be rotatable on the sleeve 62 and relative to one another to an angular extent comparable to at least one gear tooth in either direction. For this, as shown in FIGS. 3, 4A and 4B, sleeve 62 is formed with a radially outwardly extending key 66 which projects into an arcuate recess 68 in the face of pinion 64a which is opposite pinion 64b. That same key 66 also projects into a similar arcuate recess 72 in pinion 64b that recess being disposed directly opposite recess 68. Preferably, springs 74 are provided in one of the recesses, say recess 72, in order to bias the corresponding gear 64a to a neutral angular position on sleeve 62 (and shaft 26) when it is not engaged to the helical rack 18, i.e. when it is positioned between convolutions 18a.

Also as best seen in FIGS. 4A and 4B, one of the pinions, i.e. pinion 64a, is provided with a spring-loaded ball 78 which projects into an arcuate groove 82 in the counterfacing surface of the other pinion 64b. The bottom wall 82a of groove 82 is sloped so that it is deeper at the center of the groove than at the ends thereof. Thus, the wedging effect of the spring-loaded ball 78 in the groove 82 angularly biases pinion 64b to a home position wherein its teeth are in alignment with those of pinion 64a.

During operation of the transmission, when one of the shafts 16 or 42 is rotated by suitable motive means (not shown), the other shaft 42 or 16 will rotate at a speed determined by the setting of the gear member 32 along the helical rack 18. Normally for a given speed, gear member 32 is set so that it is centered on a selected rack convolution 18a. When changing speed that member is moved to or over an adjacent convolution. During that change, one of the pinions 64a, 64b, i.e. the leading pinion, will disengage from the selected convolution 18a and engage the adjacent convolution, while the other, trailing, pinion remains meshed momentarily with the selected convolution. The small misalignment of the corresponding teeth of the two adjacent rack convolutions will be accommodated by a small angular offsetting of the two pinions 64a and 64b until the trailing pinion disengages from the selected convolution, at which point the two pinions will return to their home position on sleeve 62 as the gear member 32 is centered on the adjacent convolution 18a. Since the rack is rotating, the gear member can move easily from one convolution to the next with the pinions 64a and 64b meshing with two adjacent convolutions 18a, 18a at the same time while being biased to a home position related to shaft 26 and to each other.

Since the rack 18 is continuous and wound in a helix or spiral, the gear member 32 can be set at any location along the rack and remain there, even if it engages two convolutions 18 at once, without causing wear of the gear teeth or jamming of the transmission. In other words, there are no indeterminate positions of the gear member 32 as is the case with prior comparable transmissions employing a conical gear composed of individual gear sections.

It will thus be seen that the objects set forth above among those made apparent from the preceding description are efficiently attained. Also, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. A variable drive ratio transmission comprising
   a support;
   a first shaft rotatably mounted to the support so that shaft can rotate about a first axis;
   a helical rack supported by the first shaft so that the rack has a plurality of toothed convolutions spaced apart along the first shaft, the diameters of said convolutions being such that together they define a conical envelope encircling the first shaft;
   a second shaft rotatably mounted to the support so that the second shaft is spaced from and extends parallel to said envelope, and
   a gear member mounted to the second shaft for rotation therewith, said gear member having teeth shaped to mesh with those of the rack, said gear member being slidable along the second shaft so that the gear member may be positioned at any location along the rack, said gear member including;
   first and second pinions positioned side by side on the second shaft, said first and second pinions being rotatable through a small angle relative to the second shaft, and
   first spring means for biasing said pinions to a home angular position on the second shaft.

2. The transmission defined in claim 1 wherein the rack is connected to the first shaft by a plurality of rigid spokes which extend out from the first shaft to the rack convolutions at spaced-apart locations along the rack.

3. The transmission defined in claim 1 wherein the rack is connected to the first shaft by a conical wall on the first shaft.

4. The transmission defined in claim 1 and further including means for moving the gear member along the second shaft.

5. The transmission defined in claim 4 wherein the moving means comprise a motorized actuator mounted to the support and operatively connected to the gear member.

6. The transmission defined in claim 1 wherein the combined width of said first and second pinions is greater than the spacing of the convolutions.

7. The transmission defined in claim 1 and further including second spring means for biasing the first and second pinions to an angular position relative to each other wherein their teeth are in alignment.

8. The transmission defined in claim 7 wherein
   the first and second pinions have counterfacing surfaces formed with opposing recesses;
   a key fixed to rotate with the second shaft projects into said recesses to limit the rotation of the pinions relative to the shaft, and
   the first spring means biases the key to a home position in the recess of said one of the pinions.

9. The transmission defined in claim 8 wherein
   the counterfacing surface of said first pinion is formed with a groove having a sloping bottom wall, and
   the second spring means include a spring-loaded ball in the counterfacing surface of said second pinion and which resiliently engages said bottom wall, the teeth of said first and second pinions being in alignment when said ball engages a deepest part of the bottom wall.

10. The transmission defined in claim 1 wherein said convolutions face away from said first shaft.

11. The transmission defined in claim 1 wherein said convolutions face toward said first shaft.

12. A variable drive ratio transmission including a support, a first shaft rotatably mounted to the support so that the shaft can rotate about a first axis, a helical rack supported by the first shaft so that the rack has a plurality of toothed convolutions spaced apart along the first shaft, the diameters of said convolutions being such that together they define an imaginary conical envelope encircling the first shaft, a second shaft rotatably mounted to the support so that the second shaft is spaced from and extends parallel to said envelope, and a gear member mounted to the second shaft for rotation therewith, said gear member including first and second similar pinions having teeth to mesh with those of the rack, said gear member being slidable along the second shaft so that the gear member may be positioned at any location along the rack, wherein said pinions are rotatable through small angles relative to the shaft and relative to each other, first resilient means bias said first pinion to a home angular position on the shaft, and second resilient means bias said pinions relatively toward a home position wherein their teeth are in alignment.

13. The transmission defined in claim 12 wherein said pinions have counterfacing surfaces formed with opposing recesses, a key fixed to rotate with the second shaft projects into said recesses to limit the rotation of the pinions relative to the shaft, and the first resilient means bias the key toward a home position in the recess of one of the pinions.

14. The transmission defined in claim 12 wherein the counterfacing surface of one of said pinions is formed with a groove having a sloping bottom wall, and the second resilient means include a spring-loaded ball in the counterfacing surface of the other of said pinions, said ball resiliently engaging said bottom wall, the teeth of the first and second pinions being in alignment when the ball engages a deepest portion of said bottom wall.

15. The transmission defined in claim 12 wherein the rack is connected to the first shaft by a plurality of rigid spokes which extend out from the first shaft to the rack convolutions at spaced-apart locations along the rack.

* * * * *